(12) United States Patent
Li

(10) Patent No.: US 12,707,530 B2
(45) Date of Patent: Aug. 11, 2026

(54) SEARCH SPACE GROUP SWITCHING METHOD AND APPARATUS

(71) Applicant: VIVO MOBILE COMMUNICATION CO., LTD., Guangdong (CN)

(72) Inventor: Dongru Li, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 331 days.

(21) Appl. No.: 18/348,541

(22) Filed: Jul. 7, 2023

(65) Prior Publication Data

US 2023/0354471 A1 Nov. 2, 2023

Related U.S. Application Data

(63) Continuation of application No. PCT/CN2022/075538, filed on Feb. 8, 2022.

(30) Foreign Application Priority Data

Feb. 10, 2021 (CN) ......................... 202110184958.0

(51) Int. Cl.

*H04W 76/28* (2018.01)
*H04W 52/02* (2009.01)
*H04W 72/04* (2023.01)
*H04W 72/1273* (2023.01)
*H04W 76/25* (2018.01)

(52) U.S. Cl.

CPC ....... *H04W 76/28* (2018.02); *H04W 52/0216* (2013.01); *H04W 72/04* (2013.01); *H04W 72/1273* (2013.01); *H04W 76/25* (2018.02)

(58) Field of Classification Search

None
See application file for complete search history.

(56) References Cited

U.S. PATENT DOCUMENTS

2020/0195410 A1 6/2020 Li et al.
2021/0235469 A1 7/2021 Mu
(Continued)

FOREIGN PATENT DOCUMENTS

CN 102104866 A 6/2011
CN 109417762 A 3/2019
(Continued)

OTHER PUBLICATIONS

First Office Action for Chinese Application No. 202110184958.0, dated Sep. 10, 2024, 24 Pages.
(Continued)

*Primary Examiner* — Jutai Kao
(74) *Attorney, Agent, or Firm* — BROOKS KUSHMAN P.C.

(57) ABSTRACT

A search space group switching method and apparatus, and pertains to the field of wireless communications technologies. The search space group switching method includes: switching to a default search space group in a case that a first condition is met, where the default search space is any one or more search space groups configured by a network side or prescribed by a protocol; where the first condition includes at least one of the following: determination of starting a DRX onduration timer; determination of switching to a first non-dormant BWP; and expiration of a BWP inactivity timer.

20 Claims, 6 Drawing Sheets

(56) References Cited

U.S. PATENT DOCUMENTS

| | | | | |
|---|---|---|---|---|
| 2021/0321446 | A1* | 10/2021 | Lee | H04L 5/0044 |
| 2022/0150946 | A1* | 5/2022 | Tsai | H04W 76/28 |
| 2023/0018093 | A1* | 1/2023 | Liao | H04L 5/0078 |
| 2023/0319830 | A1* | 10/2023 | Liang | H04L 27/26025 370/329 |
| 2024/0080859 | A1* | 3/2024 | Shubhi | H04W 76/28 |
| 2024/0121798 | A1* | 4/2024 | Guo | H04W 52/0216 |

FOREIGN PATENT DOCUMENTS

| | | | |
|---|---|---|---|
| CN | 111328143 | A | 6/2020 |
| EP | 3668264 | A1 | 6/2020 |
| WO | 2018128469 | A1 | 7/2018 |

OTHER PUBLICATIONS

Zte, Sanechips "Extension to Rel-16 DCI-based power saving adaptation during DRX Active Time" 3GPP TSG RAN WG1 #104-e, e-Meeting, Jan. 2021, R1-2100526, 8 Pages.
Extended European Search Report for Application No. 22752246.3, dated Sep. 10, 2024, 16 Pages.
First Office Action for Japanese Application No. 2023-542001, dated May 30, 2024, 11 Pages.
Moderator (Lenovo) "Summary of email discussion [100b-e-NR-unlic-NRU-DL_Signals_and_Channels-01] on SS group sets" 3GPP TSG RAN WG1#100bis-e, e-Meeting, Apr. 2020, R1-2002786, 19 Pages.
Moderator (Lenovo) "Summary #2 of email discussion [101-e-NR-unlic-NRU-DL_Signals_and_Channels-01] on Search Space" 3GPP TSG RAN WG1#101-e, e-Meeting, May 2020, R1-2005011, 28 Pages.
Ericsson "Design of active time power savings mechanisms" 3GPP TSG RAN WG1 #104-e, e-Meeting, Jan. 2021, R1-2101558, 8 Pages.
Partial Supplementary European Search Report for Application No. 22752246.3, dated May 15, 2024, 15 Pages.
China National Intellectual Property Administration (ISA/CN), International Search Report for International Application No. PCT/CN2022/075538, dated Apr. 1, 2022.
Mvo, "Remaining issued on physical DL channel design in unlicensed spectrum", R1-2000307, Feb. 2020, 2 pages.
Moderator (Lenovo), "Summary of email discussion [101-e-NR-unlic-NRU-DL_Signals_and_Channels-01] on Search Space", R1-2004851, May 2020, 25 pages.
Second Chinese Office Action for Chinese Patent Application No. 202110184958.0 mailed Nov. 14, 2025. 18 pages.

* cited by examiner

Switch to a default search space group in a case that a first condition is met, where the default search space is any one or more search space groups configured by a network side or prescribed by a protocol

31

SEARCH SPACE GROUP SWITCHING METHOD AND APPARATUS

CROSS-REFERENCE TO RELATED APPLICATIONS

This application is a continuation of International Application No. PCT/CN2022/075538, filed on Feb. 8, 2022, which claims priority to Chinese Patent Application No. 202110184958.0, filed on Feb. 10, 2021, which are incorporated herein by reference in their entireties.

TECHNICAL FIELD

This application pertains to the field of wireless communications technologies, and specifically, relates to a search space group switching method and apparatus.

BACKGROUND

A communications system supports two search space groups (SS group): search space group 0 (group0) and search space group 1 (group1). The physical downlink control channel (PDCCH) monitoring periodicity can be dynamically adjusted by implicit or explicit switching between the search space groups. However, an urgent problem to be solved is how to ensure that a terminal and a network side maintain a consistent understanding on a currently active search space group when a PDCCH monitoring state has changed.

SUMMARY

According to a first aspect, a search space group switching method is provided and performed by a terminal. The method includes:

switching to a default search space group in a case that a first condition is met, where the default search space is any one or more search space groups configured by a network side or prescribed by a protocol; where the first condition includes at least one of the following:

determination of starting a DRX onduration timer;

determination of switching to a first non-dormant BWP; or expiration of a BWP inactivity timer.

According to a second aspect, a search space group switching apparatus is provided, including:

a first execution module configured to switch to a default search space group in a case that a first condition is met, where the default search space is any one or more search space groups configured by a network side or prescribed by a protocol; where the first condition includes at least one of the following:

determination of starting a discontinuous reception DRX onduration timer;

determination of switching to a first non-dormant BWP; or expiration of a BWP inactivity timer.

According to a third aspect, a terminal is provided, where the terminal includes a processor, a memory, and a program or instructions stored in the memory and capable of running on the processor, and when the program or instructions are executed by the processor, the steps of the method according to the first aspect are implemented.

According to a fourth aspect, a readable storage medium is provided, where the readable storage medium stores a program or instructions, and when the program or the instructions are executed by a processor, the steps of the method according to the first aspect are implemented.

According to a fifth aspect, a chip is provided. The chip includes a processor and a communications interface. The communications interface is coupled to the processor, and the processor is configured to run a program or instructions on a network-side device so as to implement the method according to the first aspect.

According to a sixth aspect, a computer program product is provided, where the computer program product is stored in a non-volatile storage medium, and the computer program product is executed by at least one processor to implement the method according to the first aspect.

According to a seventh aspect, a communications device is provided, where the communications device is configured to perform the steps of the method according to the first aspect.

DETAILED DESCRIPTION

The following clearly describes the technical solutions in the embodiments of this application with reference to the accompanying drawings in the embodiments of this application. Apparently, the described embodiments are some but not all of the embodiments of this application. All other embodiments obtained by persons of ordinary skill in the art based on the embodiments of this application without creative efforts shall fall within the protection scope of this application.

The terms "first", "second", and the like in this specification and claims of this application are used to distinguish between similar objects rather than to describe a specific order or sequence. It should be understood that terms used in this way are interchangeable in appropriate circumstances so that the embodiments of this application can be implemented in other orders than the order illustrated or described herein. In addition, "first" and "second" are usually used to distinguish objects of a same type, and do not restrict a quantity of objects. For example, there may be one or a plurality of first objects. In addition, "and/or" in the specification and claims represents at least one of connected objects, and the character "/" generally indicates that the contextually associated objects have an "or" relationship.

It should be noted that the technologies described in the embodiments of this application are not limited to long term evolution (LTE)/LTE-Advanced (LTE-A) systems, and may also be used in other wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are often used interchangeably, and the technology described herein may be used in the above-mentioned systems and radio technologies as well as other systems and radio technologies. However, in the following descriptions, a new radio (NR) system is described for an illustration purpose, and NR terms are used in most of the following descriptions, although these technologies may also be applied to other applications than an NR system application, such as a sixth generation (6G) communications system.

Figure 1:
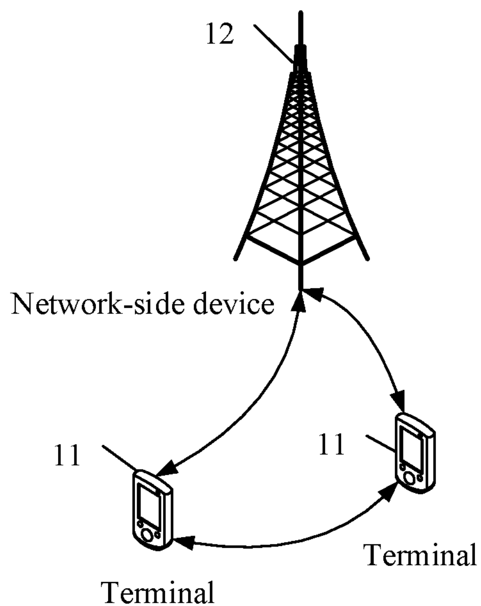
FIG. 1 is a block diagram of a wireless communications system to which embodiments of this application are applicable.

FIG. 1 is a block diagram of a wireless communications system to which embodiments of this application are applicable. The wireless communications system includes a terminal 11 and a network-side device 12. The terminal 11 may also be referred to as a terminal device or user equipment (UE). The terminal 11 may be a terminal-side device such as a mobile phone, a tablet personal computer, a laptop computer also referred to as a notebook computer, a personal digital assistant (PDA), a palmtop computer, a netbook, an ultra-mobile personal computer (UMPC), a mobile Internet device (MID), a wearable device or a vehicle user equipment (VUE), or a pedestrian user equipment (PUE). The wearable device includes a wristband, earphones, glasses, and the like. It should be noted that a specific type of the terminal 11 is not limited in the embodiments of this application. The network-side device 12 may be a base station or a core network, where the base station may be referred to as an access point, a base transceiver station (BTS), a radio base station, a radio transceiver, a basic service set (BSS), an extended service set (ESS), a home NodeB, a home evolved NodeB, a WLAN access point, a wireless fidelity (WiFi) node, a transmitting receiving point (TRP), or another appropriate term in the art. As long as the same technical effects are achieved, the base station is not limited to a specific technical term. It should be noted that the base station in the NR system is merely used as an example in the embodiments of this application, but a specific type of the base station is not limited.

The following is a brief description of the communication terms involved in this application.

1. Discontinuous Reception (DRX) Basic Model

Figure 2:
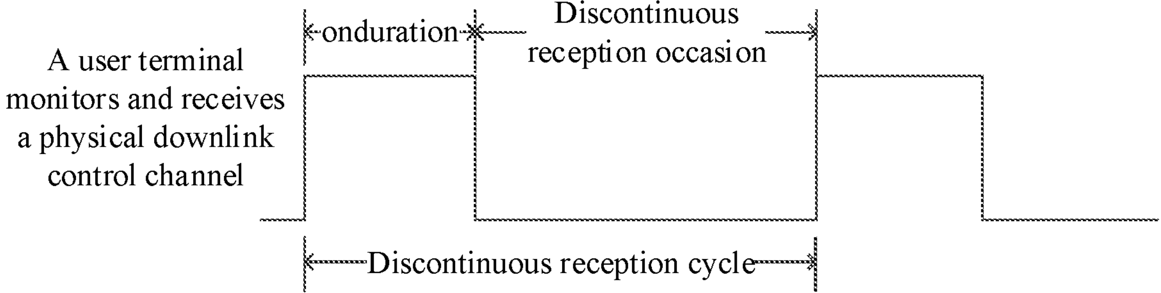
FIG. 2 is a schematic diagram of a DRX cycle.

A typical DRX cycle is shown in FIG. 2. The basic mechanism of DRX is to configure a DRX cycle for UE in a radio resource control (RRC) connected (RRC_CONNECTED) state. A DRX cycle includes "on duration" and "opportunity for DRX". During an "on duration" period, the UE monitors and receives a PDCCH; and during an "opportunity for DRX" period, the UE does not monitor PDCCH to save power.

If data arrives within the DRX onduration, the terminal starts or restarts a DRX inactivity timer (drx-inactivity-timer), and the terminal needs to monitor PDCCH when the inactivity timer is running.

2. DCP Outside Active Time

DCP stands for downlink control information (DCI) 2-6 scrambled by a PS-RNTI (power waving-radio network temporary identifier).

To further save power in DRX configuration, DCP is configured before the DRX cycle, and a wake up indication field in DCP is used to indicate whether the UE starts an onduration timer for a next DRX cycle. Starting the onduration timer means that the UE has to monitor PDCCH within the onduration timer or otherwise does not monitor PDCCH. The DCP can be configured in only a primary cell (Pcell). DCI 2-6 exists outside active time. It should be noted that DCP can be configured only when a connected DRX (CDRX) is configured.

DCI format 2-6 contains two information fields:

(1) Wake-up indication: 1 bit. This field is used to indicate whether the UE starts an onduration timer for a next DRX cycle.

(2) Secondary cell dormancy indication (Scell dormancy indication): 0, 1, 2, 3, 4, or 5 bits. This field is used to indicate whether a secondary cell (SCell) of the UE enters a dormancy state (also referred to as a dormancy behavior) under carrier aggregation (CA).

In addition, the secondary cell dormancy indication field in DCI 2-6 is used to indicate whether a secondary cell group switches to a dormant bandwidth part (BWP) on a per secondary cell group (SCell group) basis. Each bit in this field correspondingly indicates one secondary cell group.

The indication of secondary cell dormancy indication in DCI 2-6 and UE dormancy behavior are as follows:

when the indication is '0', the UE sets active downlink (DL) BWPs on all SCells of a SCell group as dormant BWPs, and the UE does not monitor PDCCH on all SCells of the SCell group, but the UE can perform channel state information (CSI) measurements; and when the indication is '1', the UE sets active DL BWPs on all SCells of a SCell group as non-dormant BWPs, and the UE can monitor PDCCH on all SCells of the SCell group.

It should be noted that there are two cases when the indication is '1', and it is necessary to determine whether to switch to a first non-dormant BWP configured by a higher layer or to continue on a current non-dormant BWP depending on whether an active BWP before the switching is a non-dormant BWP.

A Pcell has no dormancy behavior. Only a Scell has the dormancy behavior.

3. Secondary Cell Dormancy Indication within Active Time

As mentioned above, a dormancy behavior of the UE in active time is indicated by using the secondary cell dormancy indication field configured in DCI 2-6 outside active time. In addition to that, a secondary cell dormancy indication can be performed by scheduling a DCI format within active time.

Case 1 secondary cell dormancy indication: DCI format 1-1 or 0-1 is used to schedule both a PDSCH and a secondary cell dormancy indication (maximum 5 bits in the secondary cell dormancy indication field).

Case 2 secondary cell dormancy indication: DCI format 1-1 is used for a secondary cell dormancy indication and no PDSCH scheduling (reusing other scheduling related fields, maximum 16 bits).

To be specific, with the secondary cell dormancy indication configured in the DCP, the UE can be instructed to perform the dormant state switching indication outside active time, or the dormant state indication can be performed with Case 1 and Case 2 secondary cell dormancy indication within active time.

4. DCP Detection and UE Behavior

Case 1: The UE is provided with a search space set for detection of DCI format 2-6 on the Pcell. If the UE detects no DCI format 2-6, a UE behavior is to determine whether to start a DRX onduration timer or not based on a value of an RRC parameter ps-Wakeup, and the UE does not start a next DRX onduration timer when this parameter is not configured.

Case 2: The UE is provided with a search space set for detection of DCI format 2-6 on the Pcell, and there are two cases: (1) the UE does not need to detect DCI 2-6; and (2) there is no DCP monitoring occasion (MO), and a UE behavior is to start an onduration timer.

The following describes in detail a search space group switching method and apparatus in the embodiments of this application through specific embodiments and application scenarios thereof with reference to the accompanying drawings.

Figures 3, 4:
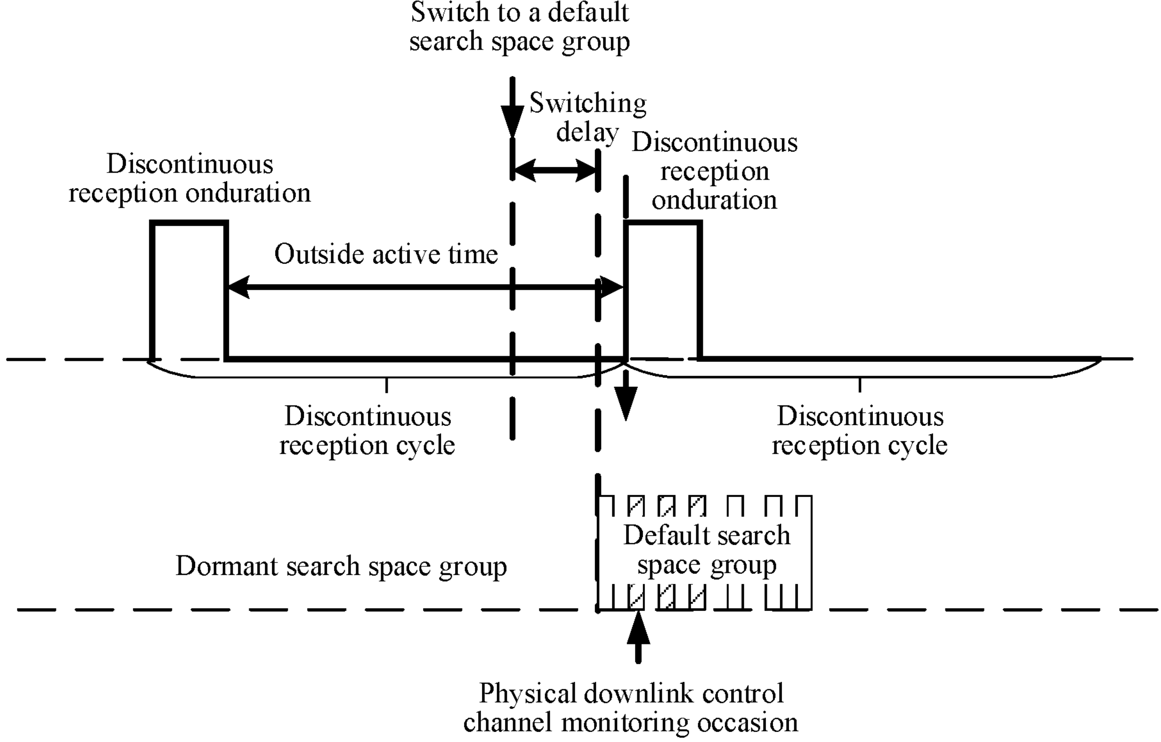
FIG. 3 is a schematic flowchart of a search space group switching method according to an embodiment of this application.
FIG. 4 is a schematic diagram of a search space group switching method according to Embodiment 1 of this application.

Referring to FIG. 3, an embodiment of this application provides a search space group switching method, performed by a terminal. The method includes:

Step 31: Switch to a default search space group in a case that a first condition is met, where the default search space is any one or more search space groups configured by a network side or prescribed by a protocol; where the first condition includes at least one of the following:

determination of starting a DRX onduration timer;

determination of switching to a first non-dormant BWP; or expiration of a BWP inactivity timer.

In this embodiment of this application, the terminal switches to the default search space group configured by the network side or prescribed by the protocol in a case that the first condition is met, such that the terminal and the network side maintain a consistent understanding on the currently active search space group, improving the data transmission performance.

In this embodiment of this application, determination of starting a DRX onduration timer may also be described as determining to enter a DRX onduration, both of which are different expressions of the same meaning.

In this embodiment of this application, a BWP before switching to a first non-dormant BWP is not limited, and the BWP can be the first non-dormant BWP, switching to a first non-dormant BWP can be understood as switching from a first non-dormant BWP to the first non-dormant BWP or switching from a dormant BWP to the first non-dormant BWP.

Optionally, the first non-dormant BWP is a non-dormant BWP with a specific index. For example, a specific index configured by a network is firstOutsideActiveTimeBWP-Id and/or firstWithinActiveTimeBWP-Id. It can be understood that if the first non-dormant BWP is a non-dormant BWP with a specific index, the switching is equivalent to switching from a dormant BWP to the first non-dormant BWP.

Optionally, in this embodiment of this application, if the first condition is met, a switching to the default search space group is performed, where a PDCCH monitoring periodicity of the search space group prior to switching to the default search space group is greater than a PDCCH monitoring periodicity of the default search space group. That is, the PDCCH monitoring periodicity of the default search space group should be shorter than the PDCCH monitoring periodicity of the search space group prior to switching to the default search space group.

It should be noted that, optionally, the PDCCH monitoring periodicity of the dormant search space group can be infinite, which means that the terminal does not need to monitor PDCCH.

With the above method, data transmission can be conveniently and quickly performed, and data transmission delay can be reduced. For example, a currently active search space group is a dormant search space group, and the terminal skips monitoring PDCCH or specific PDCCH on the dormant search space group. When a first condition is met, the terminal needs to switch to the default search space group to ensure data transmission performance and reduce data transmission delay. The first condition being met indicates the possibility of subsequent data transmission, and in this case, the switching to the default search space group with a shorter PDCCH monitoring periodicity enables the terminal to monitor PDCCH more quickly after entry of the active state.

In this embodiment of this application, optionally, the default search space group includes no dormant search space group, where the terminal skips PDCCH monitoring or does not need to perform specific PDCCH monitoring in a case that the dormant search space group is applied. The specific PDCCH may be a PDCCH that carries only CSS and/or USS of type 3. For example, the default search space group may be search space group 0 and/or search space group 1. In other words, the terminal can perform PDCCH monitoring in a case that the default search space group is applied.

In some embodiments of this application, optionally, in a case that the first condition includes determination of starting the DRX onduration timer, the switching to a default search space group includes at least one of the following.

(1) Complete switching to the default search space group prior to starting of the DRX onduration timer.

If the switching to the default search space group has been completed before the DRX onduration timer starts, the default search space group can be directly applied and PDCCH monitoring can be performed after the DRX onduration timer starts. If there is data to be transmitted after the DRX onduration timer starts, data transmission can be performed immediately, thus reducing the data transmission delay caused by a search space group switching delay or application delay and improving the data transmission performance.

(2) Start an operation of switching to the default search space group prior to starting of the DRX onduration timer.

If the operation of switching to the default search space group starts before the DRX onduration timer starts, it is possible that the switching to the default search space group has already been completed or substantially completed when the DRX onduration timer starts. If there is data to be transmitted, the data transmission delay caused by the switching of search space group can also be reduced, improving the data transmission performance.

(3) Start an operation of switching to the default search space group before a preset duration prior to starting of the DRX onduration timer.

Optionally, the preset duration is greater than or equal to a search space group switching delay or application delay. If an operation of switching to the default search space group starts before a preset duration prior to starting of the DRX onduration timer, the switching to the default search space group can be completed before the DRX onduration timer starts, and the default search space group can be directly applied and PDCCH monitoring can be performed when the DRX onduration timer starts. If there is data to be transmitted after the DRX onduration timer starts, data transmission can be performed immediately, reducing the data transmission delay caused by the switching of search space group and improving the data transmission performance.

(4) Start an operation of switching to the default search space group at the determination of starting the DRX onduration timer.

If the operation of switching to the default search space group starts when it is determined to start the DRX onduration timer, it is possible that the switching to the default search space group has already been completed or substantially completed when the DRX onduration timer starts. If there is data to be transmitted after the DRX onduration timer starts, the data transmission delay caused by the switching of search space group can also be reduced, improving the data transmission performance. The determination manner of determining to start the DRX onduration timer may be a manner of receiving explicit indication signaling, or implicit triggering manner, or the like.

(5) Start an operation of switching to the default search space group after the determination of starting the DRX onduration timer.

In some embodiments of this application, in a case that the first condition includes determination of switching to the first non-dormant BWP, the switching to the default search space group includes at least one of the following.

(1) Complete switching to the default search space group prior to switching to the first non-dormant BWP.

If the switching to the default search space group has been completed before the switching to the first non-dormant BWP, the default search space group can be directly applied and PDCCH monitoring can be performed after the switching to the first non-dormant BWP completes. If there is data to be transmitted after the switching to the first non-dormant BWP, data transmission can be performed immediately, thus reducing the data transmission delay caused by the switching of search space group and improving the data transmission performance.

(2) Start an operation of switching to the default search space group at the determination of switching to the first non-dormant BWP.

If the operation of switching to the default search space group starts when it is determined to switch to the first non-dormant BWP, it is possible that the switching to the default search space group has been completed or substantially completed when the switching to the first non-dormant BWP is being performed. If there is data to be transmitted after the switching to the first non-dormant BWP completes, the data transmission delay caused by the switching of search space group can also be reduced, improving the data transmission performance. The determination manner of determining to switch to the first non-dormant BWP may be a manner of receiving explicit indication signaling, or implicit triggering manner, or the like.

(3) Start an operation of switching to the default search space group after the determination of switching to the first non-dormant BWP.

In some embodiments of this application, in a case that the first condition includes expiration of the BWP inactivity timer, the switching to the default search space group includes at least one of the following:

(1) starting an operation of switching to the default search space group at the expiration of the BWP inactivity timer; or (2) starting an operation of switching to the default search space group after the expiration of the BWP inactivity timer.

In the embodiments of this application, optionally, whether to start a DRX onduration timer is determined based on at least one of the following:

a wake-up indication in first DCI detected, where the wake-up indication indicates whether to start a DRX onduration timer;

whether a DRX function is configured;

whether first DCI is detected;

whether monitoring for first DCI is required; or a value of PS-wakeup (power save-wakeup); where the first DCI is scrambled by a PS-RNTI. Optionally, the first DCI is DCI 2-6.

In the embodiments of this application, optionally, in a case that only the DRX function is configured, a method for determining to start a DRX onduration timer includes: determining, by the terminal, to start the DRX onduration timer prior to each DRX onduration.

In the embodiments of this application, optionally, whether to switch to a first dormant BWP is determined based on a secondary cell dormancy indication, where the secondary cell dormancy indication is carried in second DCI, the second DCI including at least one of the following:

first DCI, the first DCI being scrambled by a PS-RNTI;

DCI for scheduling data; or

DCI not for scheduling data.

For example, the second DCI may be any one or more of DCI 2-6, DCI 1-1 or DCI 0-1 for scheduling data, and DCI 1-1 not for scheduling data.

In the embodiments of this application, optionally, in a case that the first condition includes determination of switching to the first non-dormant BWP, the switching to the default search space group includes at least one of the following.

(1) Switch a cell of a switching cell group in which a cell of a secondary cell group indicated by the secondary cell dormancy indication to switch to a first non-dormant BWP is located to a default search space group.

Optionally, the first DCI and/or the DCI for scheduling data indicates whether to switch to the first non-dormant BWP on a per secondary cell group basis. Therefore, optionally, if the first DCI or the DCI for scheduling data is used to indicate whether to switch to the first non-dormant BWP, a cell of the switching cell group in which the cell of the secondary cell group indicated by the secondary cell dormancy indication to switch to the first non-dormant BWP is located is switched to the default search space group.

In the embodiments of this application, optionally, if the first DCI is used to indicate to switch to the first non-dormant BWP, an ID of the first non-dormant BWP is firstOutsideActiveTimeBWP-Id.

In the embodiments of this application, optionally, if the DCI for scheduling data is used to indicate to switch to the first non-dormant BWP, an ID of the first non-dormant BWP is firstWithinActiveTimeBWP-Id.

(2) Switch a cell of a switching cell group in which a secondary cell indicated by the secondary cell dormancy indication to switch to a first non-dormant BWP is located to a default search space group.

Optionally, the DCI not for scheduling data indicates whether to switch to the first non-dormant BWP on a per secondary cell basis. Therefore, optionally, if the DCI not for scheduling data is used to indicate whether to switch to the first non-dormant BWP, a cell of the switching cell group in which the secondary cell indicated by the secondary cell dormancy indication to switch to the first non-dormant BWP is located is switched to the default search space group.

In the embodiments of this application, optionally, if the DCI not for scheduling data is used to indicate to switch to the first non-dormant BWP, an ID of the first non-dormant BWP is firstWithinActiveTimeBWP-Id.

In the embodiments of this application, optionally, if a second condition is met, the operation of switching to the default search space group is performed, or no search space group switching is performed; where no search space group switching being performed means to maintain a currently active search space group unchanged.

The second condition includes at least one of the following:

determination of not starting a DRX onduration timer;

entry to a time at which no PDCCH monitoring is performed;

entry to a time at which monitoring on a specific PDCCH is not performed; or determination of switching to a dormant BWP.

The specific PDCCH may be a PDCCH that carries CSS and/or USS of type 3.

In the embodiments of this application, optionally, whether to start a DRX onduration timer is determined based on at least one of the following:

a wake-up indication in first DCI detected;

whether a DRX function is configured;

whether first DCI is detected;

whether monitoring for first DCI is required; or a value of PS-wakeup; where the first DCI is scrambled by a PS-RNTI.

In the embodiments of this application, optionally, in a case that the second condition includes determination of starting a DRX onduration timer, the switching to a default search space group includes at least one of the following:

starting an operation of switching to the default search space group at the determination of not starting the DRX onduration timer; or starting an operation of switching to the default search space group after the determination of starting the DRX onduration timer.

In the embodiments of this application, optionally, in a case that the second condition includes entry to a time at which no PDCCH monitoring is performed, the switching to a default search space group includes at least one of the following:

starting an operation of switching to the default search space group at the entry to a time at which no PDCCH monitoring is performed; or starting an operation of switching to the default search space group after the entry to a time at which no PDCCH monitoring is performed.

In the embodiments of this application, optionally, in a case that the second condition includes entry to a time at which monitoring on a specific PDCCH is not performed, the switching to a default search space group includes at least one of the following:

starting an operation of switching to the default search space group at the entry to a time at which monitoring on a specific PDCCH is not performed; or starting an operation of switching to the default search space group after the entry to a time at which monitoring on a specific PDCCH is not performed.

In the embodiments of this application, optionally, the period in which no PDCCH monitoring is performed includes outside active time.

In the embodiments of this application, optionally, whether to switch to a dormant BWP is determined based on a secondary cell dormancy indication, where the secondary cell dormancy indication is carried in second DCI, the second DCI including at least one of the following:

first DCI, the first DCI being scrambled by a PS-RNTI;

DCI for scheduling data; or

DCI not for scheduling data.

In the embodiments of this application, optionally, in a case that the second condition includes determination of switching to a dormant BWP, the switching to the default search space group includes at least one of the following.

(1) Switch a cell of a switching cell group in which a cell of a secondary cell group indicated by the secondary cell dormancy indication to switch to a dormant BWP is located to a default search space group.

Optionally, the first DCI and/or the DCI for scheduling data indicates whether to switch to a dormant BWP on a per secondary cell group basis. Therefore, optionally, if the first DCI or the DCI for scheduling data is used to indicate whether to switch to a dormant BWP, a cell of the switching cell group in which the cell of the secondary cell group indicated to switch to the dormant BWP is located is switched to the default search space group.

(2) Switch a cell of a switching cell group in which a secondary cell indicated by the secondary cell dormancy indication to switch to a dormant BWP is located to a default search space group.

Optionally, the DCI not for scheduling data indicates whether to switch to a dormant BWP on a per secondary cell basis. Therefore, optionally, if the DCI not for scheduling data is used to indicate whether to switch to a dormant BWP, a cell of the switching cell group in which the secondary cell indicated to switch to the dormant BWP is located is switched to the default search space group.

In the embodiments of this application, optionally, after the switching to the default search space group, the method further includes:

determining a PDCCH monitoring behavior of the terminal based on at least one of the following:

whether the switching to the default search space group has been completed;

whether it is in active time; or whether it is in a dormant state.

By way of example, the determining a PDCCH monitoring behavior of the terminal includes at least one of the following:

performing the PDCCH monitoring behavior according to PDCCH monitoring occasions corresponding to the default space group in a case that the terminal has completed switching to the default search space and is active; or performing the PDCCH monitoring behavior according to PDCCH monitoring occasions corresponding to the default space group in a case that the terminal has completed switching to the default search space and is active and in a non-dormant state; where the active BWP in the non-dormant state is the first non-dormant BWP.

It should be noted that in the embodiments of this application, optionally, the search space carrying the first DCI is not linked (link) to any search space group, which means that in a case that the current active BWP is configured with the first DCI, the terminal needs to always monitor the search space for the first DCI regardless of switching to any search space group.

The following describes the search space group switching method in the embodiments of this application with reference to specific application scenarios.

Embodiment 1 of this Application

Referring to FIG. 4, in an embodiment of this application, the network is configured with 3 search space groups (which are search space group 0, search space group 1, and a dormant search space group respectively) and a DRX function but no DCI 2-6 (first DCI). Then, a terminal completes switching to a default search space group before entry of a DRX onduration of each DRX cycle. It should be noted that even if a PDCCH monitoring occasion exists, the terminal skips PDCCH monitoring outside active time. Only after entry of the DRX onduration, the terminal performs PDCCH monitoring according to PDCCH monitoring occasions corresponding to the default search space group.

In this embodiment of this application, a protocol prescribes that the default search space group is search space group 1.

Embodiment 2 of this Application

Figure 5:
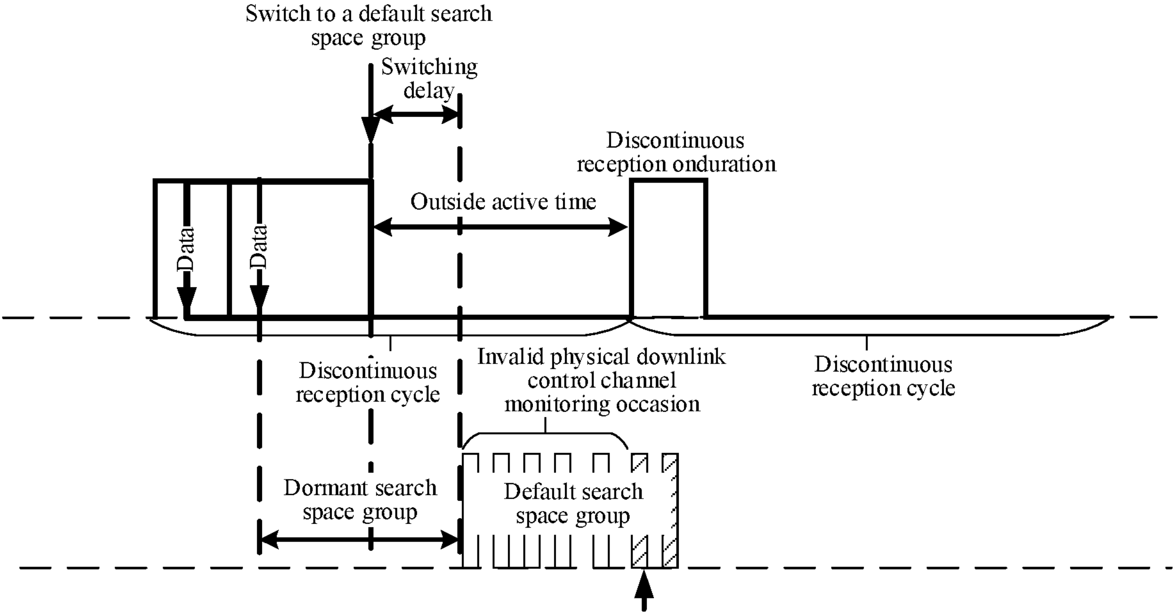
FIG. 5 is a schematic diagram of a search space group switching method according to Embodiment 2 of this application.

Referring to FIG. 5, in an embodiment of this application, the network is configured with 3 search space groups (which are search space group 0, search space group 1, and a dormant search space group respectively) and a DRX function but no DCI 2-6 (first DCI). Then, when a terminal is outside active time, the terminal switches to a default search space group so that the terminal can perform data scheduling immediately upon entry to active time. It should be noted that even if a PDCCH monitoring occasion exists, the terminal skips PDCCH monitoring outside active time. Only after entry of active time, the terminal performs PDCCH monitoring according to PDCCH monitoring occasions corresponding to the default search space group.

In this embodiment of this application, a protocol prescribes that the default search space group is search space group 0.

Embodiment 3 of this Application

Figure 6:
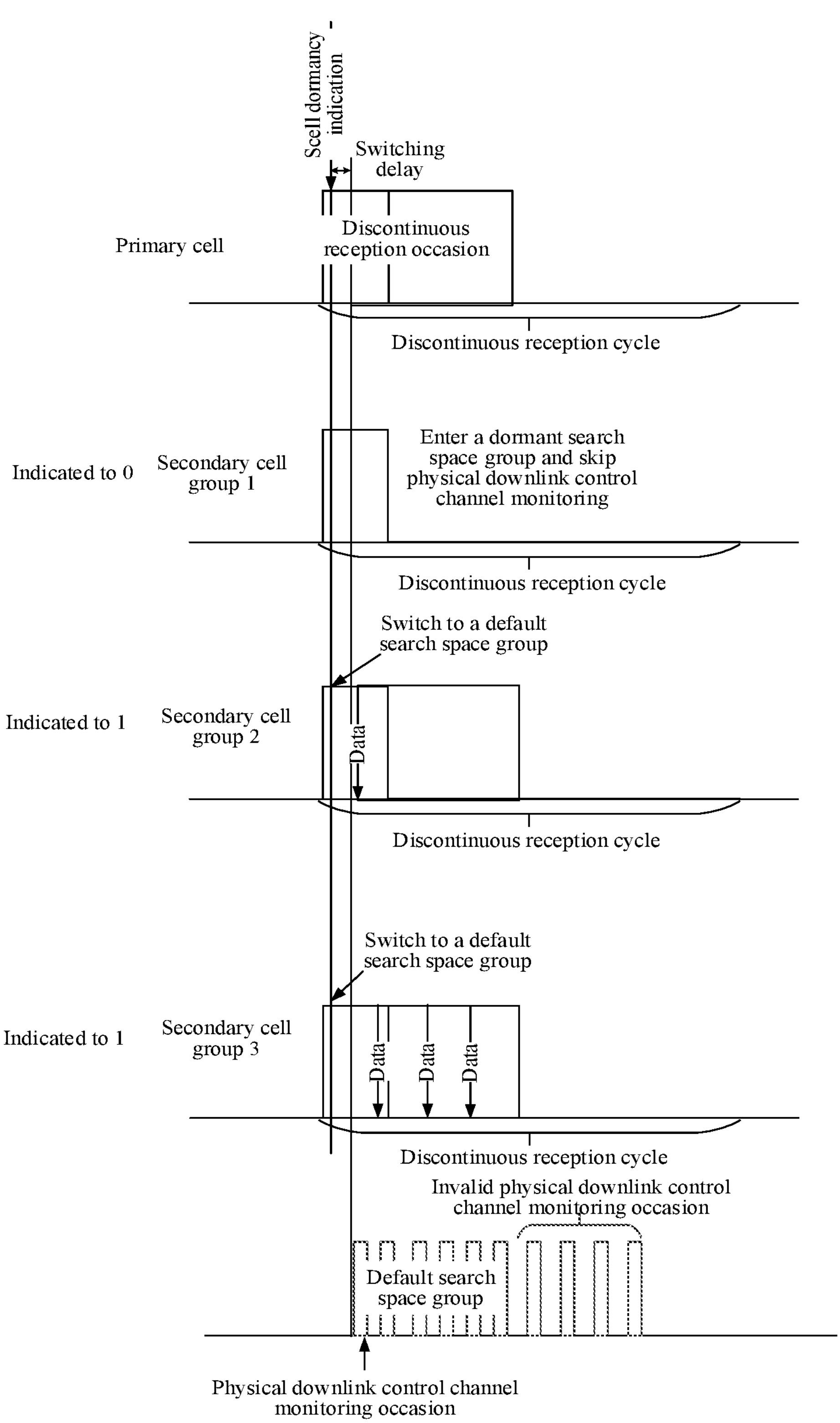
FIG. 6 is a schematic diagram of a search space group switching method according to Embodiment 3 of this application.

Referring to FIG. 6, in an embodiment of this application, the network is configured with 3 search space groups (which are search space group 0, search space group 1, and a dormant search space group respectively) and a DRX function.

In case 1 (DCI for scheduling data) and case 2 (DCI not for scheduling data), a secondary cell dormancy indication is configured; in addition, the terminal is configured with three dormant secondary cell groups.

The network is configured with no DCI 2-6 (first DCI).

When the terminal receives a secondary cell group dormancy indication bitmap of 011 in the DCI for scheduling data, the terminal switches a search space group with a dormancy indication of 1, for a cell of a switching cell group in which all secondary cells of the secondary cell groups (SCell group2 and SCell group3) that switch to a non-dormant BWP are located, to the default search space group.

In another embodiment of this application, switching to the default search space group is performed only when switching to a non-dormant BWP and switching from a dormant BWP to a non-dormant BWP are indicated.

It should be noted that the search space group switching method provided in the embodiments of this application may be performed by a search space group switching apparatus, or a control module for performing the search space group switching method in the search space group switching apparatus. In the embodiments of this application, the search space group switching apparatus provided in the embodiments of this application is described by using an example in which the search space group switching method is performed by the search space group switching apparatus.

Figure 7:
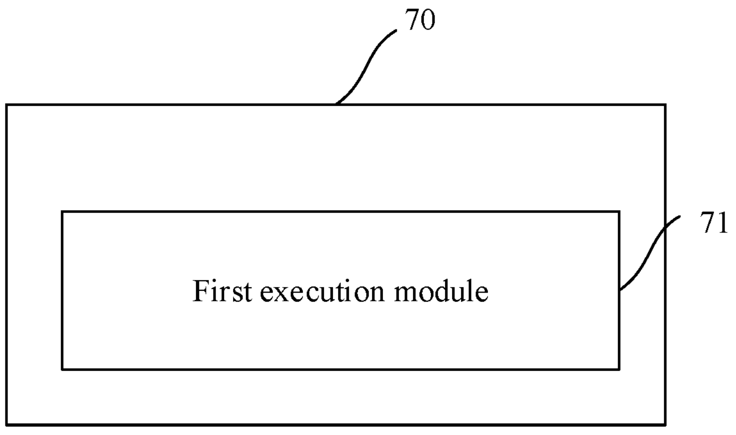
FIG. 7 is a schematic structural diagram of a search space group switching apparatus according to an embodiment of this application.

Referring to FIG. 7, an embodiment of this application further provides a search space group switching apparatus 70 including:

a first execution module 71 configured to switch to a default search space group in a case that a first condition is met, where the default search space is any one or more search space groups configured by a network side or prescribed by a protocol; where the first condition includes at least one of the following:

determination of starting a DRX onduration timer;

determination of switching to a first non-dormant BWP; or expiration of a BWP inactivity timer.

In this embodiment of this application, switching to the default search space group configured by the network side or prescribed by the protocol in a case that the first condition is met enables the terminal and the network side to maintain a consistent understanding on the currently active search space group, thereby improving the data transmission performance.

Optionally, the first non-dormant BWP is a non-dormant BWP with a specific index.

Optionally, in a case that the first condition includes determination of starting the DRX onduration timer, the first execution module 71 performs at least one of the following:

completing switching to the default search space group prior to starting of the DRX onduration timer;

starting an operation of switching to the default search space group prior to starting of the DRX onduration timer;

starting an operation of switching to the default search space group before a preset duration prior to starting of the DRX onduration timer;

starting an operation of switching to the default search space group at the determination of starting the DRX onduration timer; or starting an operation of switching to the default search space group after the determination of starting the DRX onduration timer, where the preset duration is greater than or equal to a switching delay or application delay of the search space group.

Optionally, in a case that the first condition includes determination of switching to the first non-dormant BWP, the first execution module 71 performs at least one of the following:

completing switching to the default search space group prior to switching to the first non-dormant BWP;

starting an operation of switching to the default search space group at the determination of switching to the first non-dormant BWP; or starting an operation of switching to the default search space group after the determination of switching to the first non-dormant BWP.

Optionally, in a case that the first condition includes expiration of the BWP inactivity timer, the first execution module 71 performs at least one of the following:

starting an operation of switching to the default search space group at the expiration of the BWP inactivity timer; or starting an operation of switching to the default search space group after the expiration of the BWP inactivity timer.

Optionally, the search space group switching apparatus 70 further includes:

a second execution module configured to switch to the default search space group or skip search space group switching in a case that a second condition is met; where the second condition includes at least one of the following:

determination of not starting a DRX onduration timer;

entry to a time at which no PDCCH monitoring is performed;

entry to a time at which monitoring on a specific PDCCH is not performed; or determination of switching to a dormant BWP.

Optionally, the search space group switching apparatus 70 further includes:

a first determining module configured to determine whether to start a DRX onduration timer based on at least one of the following:

a wake-up indication in first DCI detected;

whether a DRX function is configured;

whether first DCI is detected;

whether monitoring for first DCI is required; or a value of PS-wakeup; where the first DCI is scrambled by a PS-RNTI.

Optionally, the search space group switching apparatus 70 further includes:

a second determining module configured to determine to start the DRX onduration timer prior to each DRX onduration in a case that only a DRX function is configured.

Optionally, the search space group switching apparatus 70 further includes:

a third determining module configured to determine, based on a secondary cell dormancy indication, whether to switch to a first dormant BWP or a dormant BWP, where the secondary cell dormancy indication is carried in second DCI, the second DCI including at least one of the following:

first DCI, the first DCI being scrambled by a PS-RNTI;

DCI for scheduling data; or

DCI not for scheduling data.

Optionally, the first execution module performs at least one of the following:

switching a cell of a switching cell group in which a cell of a secondary cell group indicated by the secondary cell dormancy indication to switch to a first non-dormant BWP is located to a default search space group;

switching a cell of a switching cell group in which a secondary cell indicated by the secondary cell dormancy indication to switch to a first non-dormant BWP is located to a default search space group;

switching a cell of a switching cell group in which a cell of a secondary cell group indicated by the secondary cell dormancy indication to switch to a dormant BWP is located to a default search space group; or switching a cell of a switching cell group in which a secondary cell indicated by the secondary cell dormancy indication to switch to a dormant BWP is located to a default search space group.

Optionally, the search space group switching apparatus 70 further includes:

a fourth determining module configured to determine a PDCCH monitoring behavior of the terminal based on at least one of the following:

whether the switching to the default search space group has been completed;

whether it is in active time; or whether it is in a dormant state.

The search space group switching apparatus in this embodiment of this application may be an apparatus, or may be a component, an integrated circuit, or a chip in a terminal. The apparatus may be a mobile terminal or a non-mobile terminal. For example, the mobile terminal may include but is not limited to the foregoing illustrated types of terminals 11. The non-mobile terminal may be a server, a network attached storage (NAS), a personal computer (PC), a television (TV), a teller machine, a self-service machine, or the like. This is not specifically limited in the embodiments of this application.

The search space group switching apparatus in this embodiment of this application may be an apparatus with an operating system. The operating system may be an Android operating system, may be an iOS operating system, or may be another possible operating system. This is not specifically limited in this embodiment of this application.

The search space group switching apparatus provided in this embodiment of this application can implement the processes implemented in the method embodiment in FIG. 3, with the same technical effects achieved. To avoid repetition, details are not repeated herein.

Figure 8:
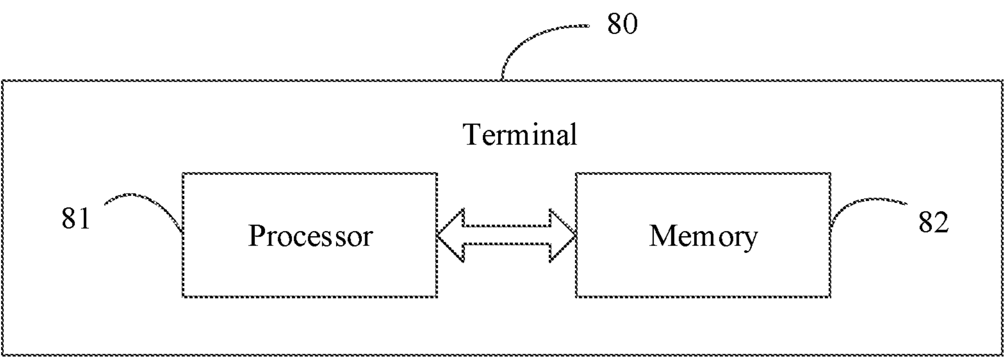
FIG. 8 is a schematic structural diagram of a terminal according to an embodiment of this application.

As shown in FIG. 8, an embodiment of this application further provides a terminal 800 including a processor 801, a memory 802, and a program or instructions stored in the memory 802 and capable of running on the processor 801, where when the program or instructions are executed by the processor 801, the processes of the foregoing embodiments of the search space group switching method are implemented, with the same technical effects achieved. To avoid repetition, details are not repeated herein.

Figure 9:
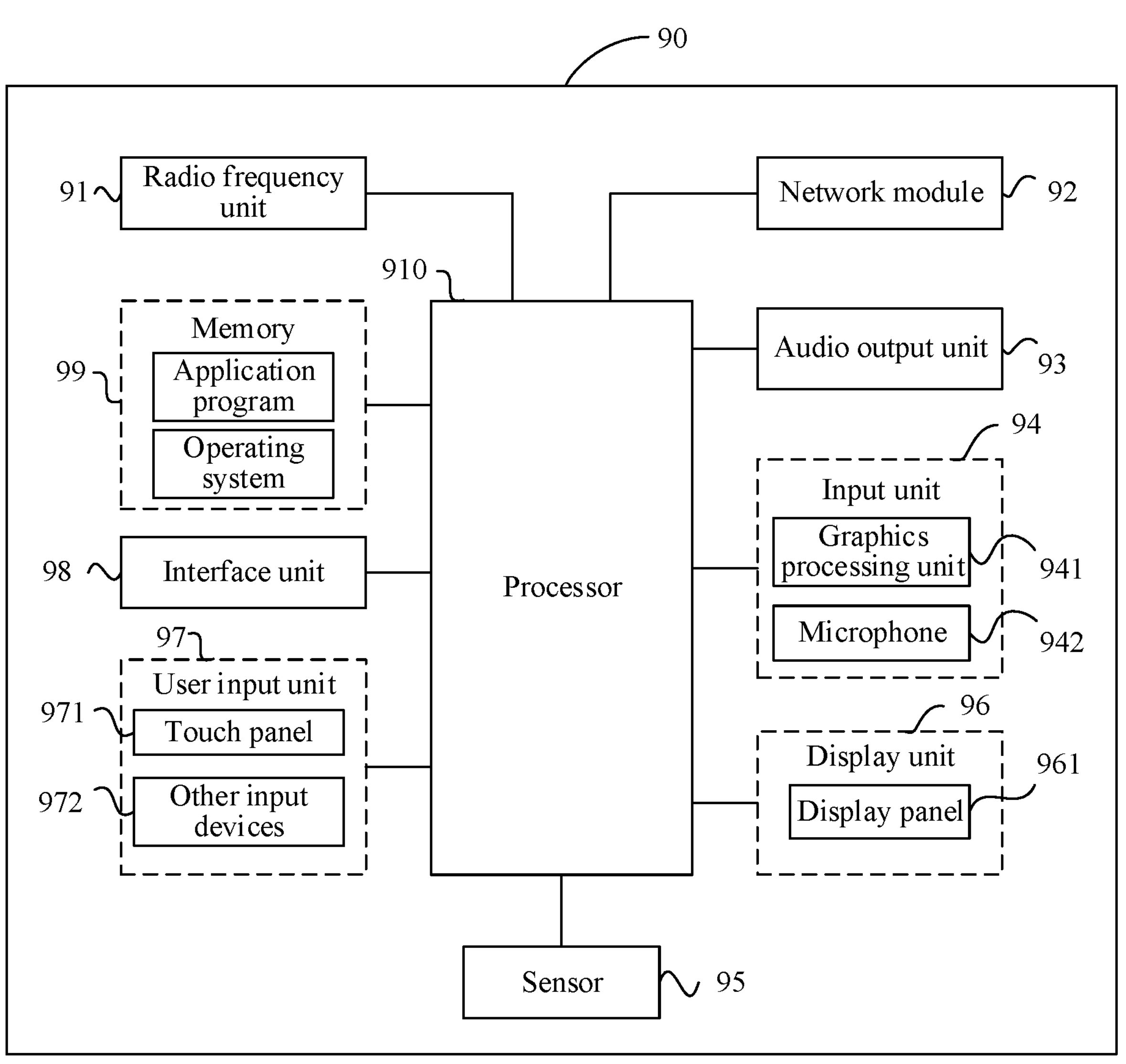
FIG. 9 is a schematic diagram of a hardware structure of a terminal according to an embodiment of this application.

FIG. 9 is a schematic diagram of a hardware structure of a terminal for implementing embodiments of this application. The terminal 90 includes but is not limited to components such as a radio frequency unit 91, a network module 92, an audio output unit 93, an input unit 94, a sensor 95, a display unit 96, a user input unit 97, an interface unit 98, a memory 99, and a processor 910.

Persons skilled in the art can understand that the terminal 90 may further include a power supply (such as a battery) for supplying power to the components. The power supply may be logically connected to the processor 910 through a power management system. In this way, functions such as charge management, discharge management, and power consumption management are implemented by using the power management system. The structure of the terminal shown in FIG. 9 does not constitute any limitation on the terminal. The terminal may include more or fewer components than shown in the figure, or combine some of the components, or arrange the components differently. Details are not repeated herein.

It should be understood that in this embodiment of this application, the input unit 94 may include a graphics processing unit (GPU) 941 and a microphone 942. The graphics processing unit 941 processes image data of a static picture or a video that is obtained by an image capture apparatus (for example, a camera) in a video capture mode or an image capture mode. The display unit 96 may include the display panel 961. The display panel 961 may be configured in a form of a liquid crystal display, an organic light-emitting diode, or the like. The user input unit 97 includes a touch panel 971 and other input devices 972. The touch panel 971 is also referred to as a touchscreen. The touch panel 971 may include two parts: a touch detection apparatus and a touch controller. The other input devices 972 may include but are not limited to a physical keyboard, a function button (for example, a volume control button or a power button), a trackball, a mouse, and a joystick. Details are not described herein.

In this embodiment of this application, the radio frequency unit 91 sends downlink data received from a network-side device to the processor 910 for processing, and in addition, sends uplink data to the network-side device. Generally, the radio frequency unit 91 includes but is not limited to an antenna, at least one amplifier, a transceiver, a coupler, a low noise amplifier, and a duplexer.

The memory 99 may be configured to store software programs or instructions and various data. The memory 99 may mainly include a program or instruction storage area and a data storage area. The program or instruction storage area may store an operating system, an application program or instruction required by at least one function (for example, a sound play function and an image play function), and the like. In addition, the memory 99 may include a high-speed random access memory, and may further include a non-volatile memory, where the non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one disk storage device, a flash memory device, or other non-volatile solid-state storage devices.

The processor 910 may include one or more processing units. Optionally, the processor 910 may integrate an application processor and a modem processor. The application processor mainly processes an operating system, a user interface, an application program or instructions, and the like. The modem processor mainly processes wireless communication, and for example, may be a baseband processor. It can be understood that the modem processor may be alternatively not integrated in the processor 910.

The processor 910 is configured to switch to a default search space group in a case that a first condition is met, where the default search space is any one or more search space groups configured by a network side or prescribed by a protocol; where the first condition includes at least one of the following:

determination of starting a DRX onduration timer;

determination of switching to a first non-dormant BWP; or expiration of a BWP inactivity timer.

In this embodiment of this application, switching to the default search space group configured by the network side or prescribed by the protocol in a case that the first condition is met enables the terminal and the network side to maintain a consistent understanding on the currently active search space group, thereby improving the data transmission performance.

Optionally, the first non-dormant BWP is a non-dormant BWP with a specific index.

Optionally, in a case that the first condition includes determination of starting the DRX onduration timer, the switching to a default search space group includes at least one of the following:

completing switching to the default search space group prior to starting of the DRX onduration timer;

starting an operation of switching to the default search space group prior to starting of the DRX onduration timer;

starting an operation of switching to the default search space group before a preset duration prior to starting of the DRX onduration timer;

starting an operation of switching to the default search space group at the determination of starting the DRX onduration timer; or starting an operation of switching to the default search space group after the determination of starting the DRX onduration timer, where the preset duration is greater than or equal to a switching delay or application delay of the search space group.

Optionally, in a case that the first condition includes determination of switching to the first non-dormant BWP, the switching to the default search space group includes at least one of the following:

completing switching to the default search space group prior to switching to the first non-dormant BWP;

starting an operation of switching to the default search space group at the determination of switching to the first non-dormant BWP; or starting an operation of switching to the default search space group after the determination of switching to the first non-dormant BWP.

Optionally, in a case that the first condition includes expiration of the BWP inactivity timer, the switching to a default search space group includes at least one of the following:

starting an operation of switching to the default search space group at the expiration of the BWP inactivity timer; or starting an operation of switching to the default search space group after the expiration of the BWP inactivity timer.

Optionally, the processor 910 is further configured to switch to the default search space group or skip search space group switching in a case that a second condition is met; where the second condition includes at least one of the following:

determination of not starting a DRX onduration timer;

entry to a time at which no physical downlink control channel PDCCH monitoring is performed;

entry to a time at which monitoring on a specific PDCCH is not performed; or determination of switching to a dormant BWP.

Optionally, the processor 910 is further configured to determine whether to start a DRX onduration timer based on at least one of the following:

a wake-up indication in first DCI detected;

whether a DRX function is configured;

whether first DCI is detected;

whether monitoring for first DCI is required; or a value of PS-wakeup; where the first DCI is scrambled by a PS-RNTI.

Optionally, the processor 910 is further configured to determine to start the DRX onduration timer prior to each DRX onduration in a case that only a DRX function is configured.

Optionally, the processor 910 is further configured to determine, based on a secondary cell dormancy indication, whether to switch to a first dormant BWP or a dormant BWP, where the secondary cell dormancy indication is carried in second DCI, the second DCI including at least one of the following:

first DCI, the first DCI being scrambled by a PS-RNTI;
DCI for scheduling data; or
DCI not for scheduling data.

Optionally, the switching to a default search space group includes at least one of the following:

switching a cell of a switching cell group in which a cell of a secondary cell group indicated by the secondary cell dormancy indication to switch to a first non-dormant BWP is located to a default search space group;

switching a cell of a switching cell group in which a secondary cell indicated by the secondary cell dormancy indication to switch to a first non-dormant BWP is located to a default search space group;

switching a cell of a switching cell group in which a cell of a secondary cell group indicated by the secondary cell dormancy indication to switch to a dormant BWP is located to a default search space group; or switching a cell of a switching cell group in which a secondary cell indicated by the secondary cell dormancy indication to switch to a dormant BWP is located to a default search space group.

Optionally, the default search space group includes no dormant search space group, where the terminal skips PDCCH monitoring or does not need to perform specific PDCCH monitoring in a case that the dormant search space group is applied.

Optionally, the processor 910 is further configured to determine a PDCCH monitoring behavior of the terminal based on at least one of the following:

whether the switching to the default search space group has been completed;
whether it is in active time; or
whether it is in a dormant state.

An embodiment of this application further provides a readable storage medium. The readable storage medium stores a program or instructions. When the program or instructions are executed by a processor, the processes of the foregoing embodiments of the search space group switching method are implemented, with the same technical effects achieved. To avoid repetition, details are not repeated herein.

The processor is the processor of the terminal in the foregoing embodiments. The readable storage medium includes a computer-readable storage medium, such as a computer read-only memory (ROM), a random access memory (RAM), a magnetic disk, or an optical disc.

An embodiment of this application further provides a chip, where the chip includes a processor and a communications interface, the communications interface is coupled to the processor, and the processor is configured to run a program or instructions on the network-side device to implement the processes of the foregoing embodiments of the search space group switching method, with the same technical effects achieved. To avoid repetition, details are not repeated herein.

It should be understood that the chip mentioned in the embodiments of this application may also be referred to as a system-level chip, a system chip, a chip system, a system-on-chip, or the like.

An embodiment of this application further provides a computer program product, where the computer program product is stored in a non-volatile storage medium. When the computer program product is executed by at least one processor, the steps of the foregoing embodiments of the search space group switching method are implemented, with the same technical effects achieved. To avoid repetition, details are not repeated herein.

An embodiment of this application further provides a communications device. The communications device is configured to implement the processes of the foregoing embodiments of the search space group switching method, with the same technical effects achieved. To avoid repetition, details are not repeated herein.

It should be noted that in this specification, the terms "include" and "comprise", or any of their variants are intended to cover a non-exclusive inclusion, such that a process, method, article, or apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. Furthermore, it should be noted that the scope of the methods and apparatuses in the embodiments of this application is not limited to performing the functions in the order shown or discussed, but may also include performing the functions in a substantially simultaneous manner or in a reverse order depending on the functions involved. For example, the described methods may be performed in an order different from that described, and various steps may be added, omitted, or combined. In addition, features described with reference to some examples may be combined in other examples.

By means of the foregoing description of the implementations, persons skilled in the art may clearly understand that the method in the foregoing embodiment may be implemented by software with a necessary general hardware platform. Certainly, the method in the foregoing embodiment may also be implemented by hardware. However, in many cases, the former is a preferred implementation. Based on such an understanding, the technical solutions of this application essentially or the part contributing to the prior art may be implemented in a form of a software product. The software product may be stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in each embodiment of this application.

The foregoing describes the embodiments of this application with reference to the accompanying drawings. However, this application is not limited to the foregoing specific implementations. These specific implementations are merely illustrative rather than restrictive. Inspired by this application, persons of ordinary skill in the art may develop many other forms which do not depart from the essence of this application and the protection scope of the claims, and all such forms shall fall within the protection scope of this application.

What is claimed is:

1. A search space group switching method, performed by a terminal, wherein the method comprises:

switching to a default search space group in a case that a first condition is met, wherein the default search space group is search space group 0; wherein the first condition comprises:

expiration of a bandwidth part BWP inactivity timer.

2. The method according to claim 1, wherein the first condition further comprises at least one of the following:

determination of starting a discontinuous reception DRX onduration timer;

determination of switching to a first non-dormant bandwidth part BWP, wherein the first non-dormant BWP is a non-dormant BWP with a specific index.

3. The method according to claim 2, wherein in a case that the first condition further comprises determination of starting the DRX onduration timer, the switching to a default search space group comprises at least one of the following:

completing switching to the default search space group prior to starting of the DRX onduration timer;

starting an operation of switching to the default search space group prior to starting of the DRX onduration timer;

starting an operation of switching to the default search space group before a preset duration prior to starting of the DRX onduration timer;

starting an operation of switching to the default search space group at the determination of starting the DRX onduration timer; or starting an operation of switching to the default search space group after the determination of starting the DRX onduration timer; wherein the preset duration is greater than or equal to a switching delay or application delay of the search space group.

4. The method according to claim 2, wherein in a case that the first condition further comprises determination of switching to the first non-dormant BWP, the switching to a default search space group comprises at least one of the following:

completing switching to the default search space group prior to switching to the first non-dormant BWP;

starting an operation of switching to the default search space group at the determination of switching to the first non-dormant BWP; or starting an operation of switching to the default search space group after the determination of switching to the first non-dormant BWP.

5. The method according to claim 2, further comprising:

switching to the default search space group or skipping search space group switching in a case that a second condition is met; wherein the second condition comprises at least one of the following:

determination of not starting a DRX onduration timer;

entry to a time at which no physical downlink control channel PDCCH monitoring is performed;

entry to a time at which monitoring on a specific PDCCH is not performed; or determination of switching to a dormant BWP.

6. The method according to claim 2, wherein whether to start a DRX onduration timer or not is determined based on at least one of the following:

a wake-up indication in first DCI detected;

whether a DRX function is configured;

whether first DCI is detected;

whether monitoring for first DCI is required; or a value of PS-wakeup; wherein the first DCI is scrambled by a PS-RNTI.

7. The method according to claim 2, wherein in a case that only a DRX function is configured, a method for determining to start a DRX onduration timer comprises:

determining, by the terminal, to start the DRX onduration timer prior to each DRX onduration.

8. The method according to claim 2, wherein whether to switch to a first dormant BWP or a dormant BWP is determined based on a secondary cell dormancy indication, wherein the secondary cell dormancy indication is carried in second DCI, the second DCI comprising at least one of the following:

first DCI, the first DCI being scrambled by a power saving radio network temporary identifier PS-RNTI;

DCI for scheduling data; or

DCI not for scheduling data.

9. The method according to claim 8, wherein the switching to a default search space group comprises at least one of the following:

switching a cell of a switching cell group in which a cell of a secondary cell group indicated by the secondary cell dormancy indication to switch to a first non-dormant BWP is located to a default search space group;

switching a cell of a switching cell group in which a secondary cell indicated by the secondary cell dormancy indication to switch to a first non-dormant BWP is located to a default search space group;

switching a cell of a switching cell group in which a cell of a secondary cell group indicated by the secondary cell dormancy indication to switch to a dormant BWP is located to a default search space group; or switching a cell of a switching cell group in which a secondary cell indicated by the secondary cell dormancy indication to switch to a dormant BWP is located to a default search space group.

10. The method according to claim 1, wherein the switching to a default search space group comprises at least one of the following:

starting an operation of switching to the default search space group at the expiration of the BWP inactivity timer; or starting an operation of switching to the default search space group after the expiration of the BWP inactivity timer.

11. The method according to claim 1, wherein the default search space group comprises no dormant search space group, wherein the terminal skips PDCCH monitoring or does not need to perform specific PDCCH monitoring in a case that the dormant search space group is applied.

12. The method according to claim 1, after the switching to a default search space group, further comprising:

determining a PDCCH monitoring behavior of the terminal based on at least one of the following:

whether the switching to the default search space group has been completed;

whether the terminal is in active time; or whether the terminal is in a dormant state.

13. A terminal, comprising a processor, a memory, and a program or instructions stored in the memory and capable of running on the processor, wherein when the program or instructions are executed by the processor, the following steps are implemented:

switching to a default search space group in a case that a first condition is met, wherein the default search space group is search space group 0; wherein the first condition comprises:

expiration of a bandwidth part BWP inactivity timer.

14. The terminal according to claim 13, wherein the first condition further comprises at least one of the following:

determination of starting a discontinuous reception DRX onduration timer;

determination of switching to a first non-dormant bandwidth part BWP, wherein the first non-dormant BWP is a non-dormant BWP with a specific index.

15. The terminal according to claim 14, wherein in a case that the first condition further comprises determination of switching to the first non-dormant BWP, the switching to a default search space group comprises at least one of the following:

completing switching to the default search space group prior to switching to the first non-dormant BWP;

starting an operation of switching to the default search space group at the determination of switching to the first non-dormant BWP; or starting an operation of switching to the default search space group after the determination of switching to the first non-dormant BWP;

or, in a case that the first condition further comprises determination of starting the DRX onduration timer, the switching to a default search space group comprises at least one of the following:

completing switching to the default search space group prior to starting of the DRX onduration timer;

starting an operation of switching to the default search space group prior to starting of the DRX onduration timer;

starting an operation of switching to the default search space group before a preset duration prior to starting of the DRX onduration timer;

starting an operation of switching to the default search space group at the determination of starting the DRX onduration timer; or starting an operation of switching to the default search space group after the determination of starting the DRX onduration timer; wherein the preset duration is greater than or equal to a switching delay or application delay of the search space group.

16. The terminal according to claim 14, wherein when the program or instructions are executed by the processor, the following steps are implemented:

switching to the default search space group or skipping search space group switching in a case that a second condition is met; wherein the second condition comprises at least one of the following:

determination of not starting a DRX onduration timer;

entry to a time at which no physical downlink control channel PDCCH monitoring is performed;

entry to a time at which monitoring on a specific PDCCH is not performed; or determination of switching to a dormant BWP.

17. The terminal according to claim 14, wherein whether to start a DRX onduration timer or not is determined based on at least one of the following:

a wake-up indication in first DCI detected;

whether a DRX function is configured;

whether first DCI is detected;

whether monitoring for first DCI is required; or a value of PS-wakeup; wherein the first DCI is scrambled by a PS-RNTI.

18. The terminal according to claim 14, wherein whether to switch to a first dormant BWP or a dormant BWP is determined based on a secondary cell dormancy indication, wherein the secondary cell dormancy indication is carried in second DCI, the second DCI comprising at least one of the following:

first DCI, the first DCI being scrambled by a power saving radio network temporary identifier PS-RNTI;

DCI for scheduling data; or

DCI not for scheduling data.

19. The terminal according to claim 13, wherein the switching to a default search space group comprises at least one of the following:

starting an operation of switching to the default search space group at the expiration of the BWP inactivity timer; or starting an operation of switching to the default search space group after the expiration of the BWP inactivity timer.

20. A non-transitory readable storage medium, wherein the non-transitory readable storage medium stores a program or instructions, and when the program or instructions are executed by a processor, the following steps are implemented:

switching to a default search space group in a case that a first condition is met wherein the default search space group is search space group 0; wherein the first condition comprises:

expiration of a bandwidth part BWP inactivity timer.

* * * * *